United States Patent [19]
Golemon

[11] 3,880,208
[45] Apr. 29, 1975

[54] PLASTIC INJECTION MOLDING APPARATUS

[76] Inventor: Valia S. Golemon, 7845 Sancola Ave., Sun Valley, Calif. 91357

[22] Filed: Apr. 19, 1973

[21] Appl. No.: 352,688

[52] U.S. Cl. .................. 141/82; 141/352; 239/541
[51] Int. Cl. ............................................ B65b 3/18
[58] Field of Search ................. 222/257, 531, 532; 141/351–362, 82, 392; 425/245 R, DIG. 226; 251/149.1, 149.6, 149.7; 239/541, 570, 135, 136, 137

[56] References Cited
UNITED STATES PATENTS

| | | | |
|---|---|---|---|
| 1,714,465 | 5/1929 | Murphy | 141/352 |
| 1,744,793 | 1/1930 | Norton | 141/352 |
| 1,770,071 | 7/1930 | Davis | 141/352 |
| 1,909,678 | 5/1933 | Hillis | 141/352 |

FOREIGN PATENTS OR APPLICATIONS

| | | | |
|---|---|---|---|
| 360,234 | 9/1922 | Germany | 141/352 |

*Primary Examiner*—Houston S. Bell, Jr.
*Attorney, Agent, or Firm*—Fred W. Schwend

[57] ABSTRACT

A plastic injection molding device adapted to be mounted on a standard drill press or the like and comprising a plastic heating cylinder supported for limited vertical sliding movement by the chuck of the press. A plunger is also carried by the chuck and is effective, when the injection nozzle engages the mold, to force a charge of plastic from the cylinder and through the nozzle into the mold. Valve means within the nozzle opens to permit flow of plastic when the nozzle engages the mold and closes when the nozzle is separated from the mold.

5 Claims, 5 Drawing Figures

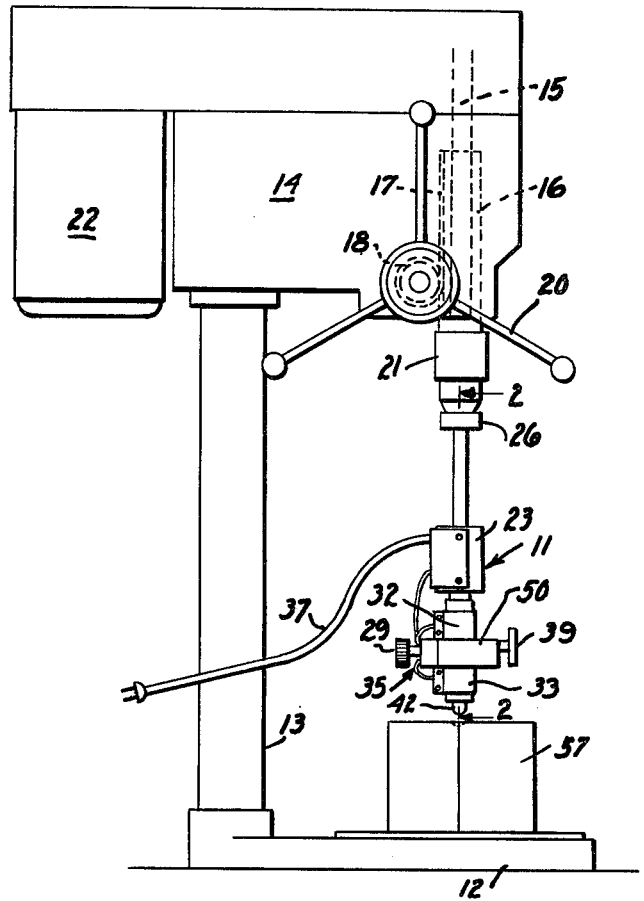
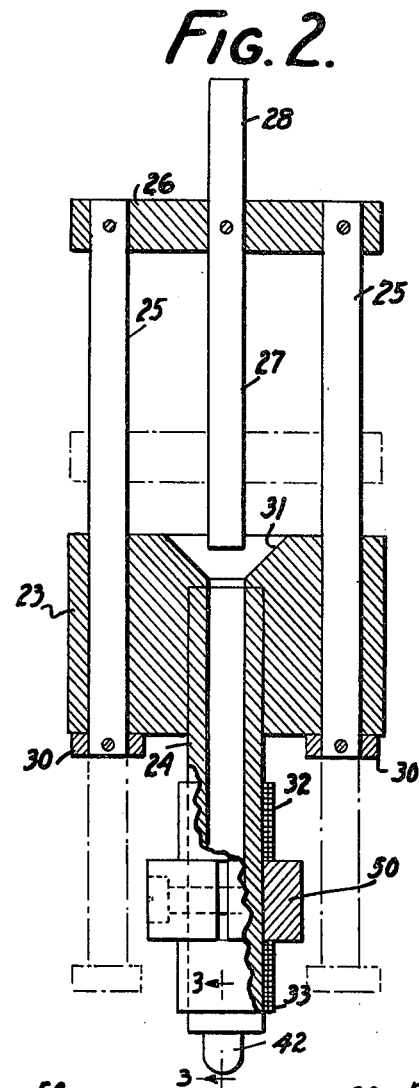
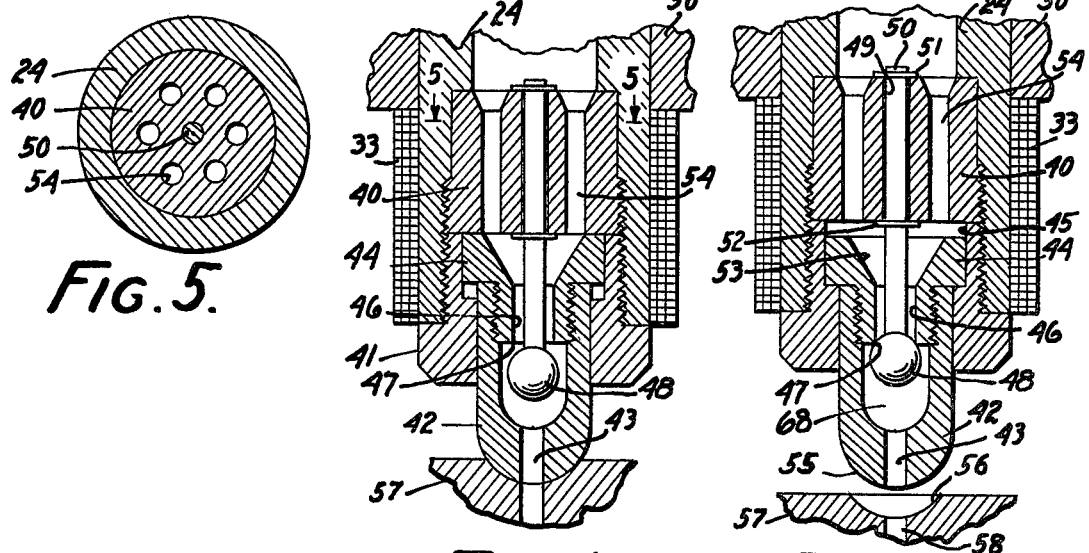

PLASTIC INJECTION MOLDING APPARATUS

BACKGROUND OF THE INVENTION

1. Field of the Invention

This invention relates to plastic molding apparatus, and has particular reference to a simple and inexpensive plastic injection molding device.

2. Description of the Prior Art

Heretofore, injection molding apparatus have generally been relatively complicated, cumbersome and expensive. Such an apparatus usually includes structure for supporting and moving the plastic injection device, and the mold relative to each other, for automatically operating the injection device, etc. Accordingly, such molding apparatus have heretofore been too expensive for a small firm or individual whose business is not primarily that of plastic molding and who may wish to mold only a relatively small number of parts.

Also, in prior injection molding apparatus, the molten plastic tends to leak or dribble from the nozzle when the latter is separated from the mold for an appreciable period of time. Although valves have been used heretofore to stop the flow of plastic to the nozzle, they have not been completely satisfactory. For example, such valves that applicant is aware of tend to clog up and are difficult to clean due to divergent passages therein and the fact that the valve and valve seat are located a considerable distance from the orifice. Further, prior art valves of this type have proved unreliable and expensive to manufacture.

SUMMARY OF THE INVENTION

According to the present invention, a relatively simple plastic injector is provided which can be attached to a standard drill press, arbor or other press normally found in any well-equipped shop. The injector comprises a plastic heating cylinder having a nozzle at the lower end thereof which also forms part of a valve means to prevent the flow of molten plastic from the cylinder and through the nozzle when the latter is removed from the sprue opening or socket of the mold. The cylinder is carried by a slide bearing supported by the vertically movable chuck of the press. When the nozzle is moved into cooperative engagement with the mold, the cylinder continues to move to open the valve, and at this time, a plunger is advanced through the cylinder, causing the plastic to flow into the mold. Since the valve and valve seat are located directly adjacent the nozzle orifice and coaxially of the cylinder and nozzle orifice, a negligible amount of plastic, if any, can exude after the injector is removed. Also, it is easier to clean the plastic from the valve and valve seat, should that be desireable. Further, such valving action is completely automatic and requires no exterior controls or attention of the operator.

Therefore, a principal object of the present invention is to provide a small, compact and inexpensive plastic injection molding device which can be readily mounted for operation on a standard drill press or the like.

Another object is to provide an improved plastic injection molding device incorporating a simple yet automatically operable valve means for preventing flow of molten plastic through the nozzle when the latter is removed from the mold.

Another object is to maintain a charge of plastic within a plastic molding device at an even and constant temperature throughout, particularly during movement of the molten plastic into the injection nozzle.

BRIEF DESCRIPTION OF THE DRAWINGS

The manner in which the above and other objects of the invention are accomplished will be readily understood on reference of the following specification when read in conjunction with the accompanying drawings, wherein:

FIG. 1 is a side elevation view of a plastic injection molding device embodying a preferred form of the present invention and illustrated as mounted on a conventional drill press.

FIG. 2 is a sectional view of the molding device and is taken substantially along the line 2—2 of FIG. 1.

FIG. 3 is an enlarged sectional view of the lower end of the molding device and is taken along line 3—3 of FIG. 2, illustrating the device in closed condition.

FIG. 4 is a sectional view similar to that of FIG. 3 but illustrating the molding device in open condition.

FIG. 5 is a sectional plan view taken along the line 5—5 of FIG. 4.

DESCRIPTION OF THE ILLUSTRATED EMBODIMENT

Referring to the drawings, the molding device, generally indicated at 11, is depicted as being mounted on a conventional drill press comprising a base 12 which supports a vertical column 13 on which is mounted a drill head 14. A spindle 15 is supported for rotation within a hollow quill 16 movable axially in bearings, not shown, mounted in the head 14. A gear rack 17 formed on the quill 16 meshes with a pinion 18 rotatably mounted in the head 14 and attached to a three arm hand crank 20. The spindle 15 has a chuck 21 attached thereto. Normally, the spindle 15 is rotated by a motor 22 for the purpose of driving a drilling or cutting tool secured to the chuck 21 but, for the purpose of the present invention, the spindle 15 is not rotated. However, upon rotation of the crank in the appropriate direction, the chuck 21 may be raised or lowered.

According to the present invention, the molding device 11 comprises a body 23 to which is integrally attached a tubular member 24 forming a plastic heating cylinder. The body 23 is slidably mounted on a pair of spaced vertical guide rods 25 secured at their upper ends to a crosshead 26 to which is also secured a third rod 27 forming the ram or plunger. A portion 28 of the rod 27 extends above the crosshead 26 to form a shank arranged to be clutched by the chuck 21.

Collars 30 are secured to the lower ends of the rods 25 below the body 23 to limit downward movement of the body and heating cylinder 24 by gravity into their lower-most positions shown in FIG. 2, relative to the crosshead.

The lower end of the ram 27 extends partly into a conical cup formation 31 formed in the body 23 and opening into the heating cylinder 24, whereby plastic pellets or particles may be poured into the cylinder.

Controllable electric heating means is provided to heat the lower end of the cylinder 24 to melt the plastic within the cylinder and to maintain the same in molten condition. Such heating means comprises a pair of spaced heater coils 32 and 33 of suitable high resistance material. A block 50 of aluminum or similar metal having a relatively high heat conductivity factor is suitably attached to the cylinder 24 intermediate the heater coils 32 and 33, and an adjustable thermostat generally indicated at 35 is suitably attached to the block 34 so as to respond to the temperature induced in the heating cylinder 24 by the heater coils 32 and 33. The thermostat is of conventional construction and is electrically connected as a switch in circuit with the heater coils 32 and 33 and this assembly is connected to a suitable source of electric power through a flexible wire connector 37. The connector 37 is electrically connected to the thermostat, etc. A suitable visual indicator 39 is also attached to the block 34 to indicate the temperature of the cylinder 24.

The lower end of the heating cylinder 24 is counterbored to receive a cylindrical spreader block 40 which is held in place by a hollow cap 41 screw threaded into the lower end of the cylinder 24.

A nozzle is provided comprising a hollow nozzle 42 having a nozzle orifice 43 therein. The nozzle member is slidably fitted within the cap 41 and is threadably attached to a nozzle bushing 44. The latter slides within a counterbored opening 45 in the cap member 41. Thus, the nozzle member 42 and bushing 44 may move endwise a limited amount relative to the cylinder 24.

An axial passage 46 is formed in the bushing 44 and terminates at its lower end in an annular valve seat 47 forming part of a plastic shut-off valve, the other part of which is formed by a spherical valve member 48 integrally mounted on the lower end of a rod 50 which extends through an axial opening 49 in the block 40 and is held axially immovable therethrough by suitable clips 51 and 52 which engage opposite ends of the block. The opening 49 is slightly larger than the diameter of the rod 50 to permit a slight lateral movement of the valve member 48 so as to properly seat on the valve seat 47.

The upper end of the passage 46 is conically shaped at 53 to communicate with a series of six longitudinally extending spreader passages 54 formed in the block 40 and arranged in a circular array, as shown in FIG. 5. Such spaced passages are relatively small in contrast to the lengths and thus the veins or columns of plastic passing therethrough are evenly heated throughout to the desired temperature as determined by the thermostat 35.

Although the passages 54 may be made of different diameters, it has been found that with a cylinder 24 having an inside diameter of 7/16 inches and a spreader block 40 of ⅝ inches in length, passages on the order of 3/32 inches in diameter work very satisfactory. Obviously, more or less passages 54 may be formed in the block 40.

The nozzle 42 has a semi-spherical tip 55 adapted to seat within a mating socket 56 formed in a suitable plastic mold 57 (FIGS. 1, 3 and 4). The latter may be of conventional construction and has a suitable sprue opening 58 leading from the socket 56 to a mold cavity (not shown) within the mold.

In operation, the mold 57 is located on the base 12 with its socket 56 in vertical alignment with the nozzle 42 and the thermostat 35 is set by manipulating an adjusting knob 29 thereon to appropriately control the temperature of the heating cylinder 24. Plastic particles are then poured into the cup 31 to charge the cylinder 24. At this time, since the nozzle 42 is out of engagement with the mold 57, as depicted in FIG. 3, the valve means 47–48 is closed, preventing any molten plastic from exuding from the nozzle orifice 43.

When the crank 20 is rotated clockwise to lower the device 11 the nozzle 42 will first seat within the sprue socket 56 and as the body 23 and cylinder 24 continue downwardly, they move relative to the nozzle until the parts reach their relative positions shown in FIG. 4. At this time, the valve 47–48 is opened, establishing a plastic flow-path from the lower end of the cylinder 24, through passages 54, passage 46 and nozzle orifice 43, into the mold 57. Although downward movement of the body 23 is arrested due to engagement of the bushing 44 with the underside of the block 40, continued rotation of the crank 20 will cause the ram 27 to force the molten plastic through the cylinder 24 and passages 54, causing it to flow downwardly through the now opened valve 47–48 and nozzle orifice 43, into the mold 57.

It will be noted that the outer diameter of the bushing 44 is preferably larger than the inside diameter of the cylinder 24. Also, due to the relatively large projected area of the upper part of the bushing 44 and the relatively small cross-sectional area of the passage 46, the pressure applied to the plastic by the ram 27 will impart sufficient downward force to the nozzle member 42 to prevent leakage between the nozzle tip 55 and mold socket 56.

When the mold 57 is filled, the crank 20 is rotated counterclockwise to raise the crosshead 26 and subsequently the block 23 any cylinder 24. Due to the pressure of the molten plastic, caused in part by gases formed therein, a downward force is exerted on the nozzle 42, and as the cylinder 24 is raised, the nozzle 42 will move downwardly to its position shown in FIG. 3 to close the valve 47-48 and thus prevent further flow of plastic. A negligible flow will result from the plastic remaining on the cavity 68 of the nozzle 42 and the nozzle orifice 43.

I claim:

1. Plastic injection molding apparatus comprising a plastic heating cylinder,
   a nozzle member adjacent one end of said cylinder, said member having a nozzle orifice therein,
   means on said cylinder supporting said nozzle member for endwise movement between extended and contracted positions relative to said cylinder,
   spreader means intermediate said cylinder and said orifice forming a plurality of spreader passages for conveying plastic from said cylinder to said orifice,
   each of said passages being of relatively smaller cross-sectional area than the cross-sectional area of said cylinder,
   means for feeding plastic through said cylinder, said passages and said orifice,
   valve means intermediate said spreader means and said orifice,
   said valve means comprising,
   an annular valve seat on said nozzle member and a valve member supported by said cylinder intermediate said valve seat and said orifice;
   said valve member seating against said valve seat upon movement of said nozzle member to said extended position and unseating from said valve seat upon movement of said nozzle member toward said contracted position.

2. Plastic injection molding apparatus comprising a plastic heating cylinder,
   means for feeding plastic through said cylinder, said cylinder having a counterbore at one end thereof, a spreader block in said counterbore, said block having a plurality of passages extending lengthwise therethrough, a cap secured in said counterbore for preventing endwise movement of said block relative to said cylinder, said cap having a second counterbore therethrough, a nozzle slidable endwise in second counterbore for movement between extended and contracted positions relative to said cylinder, means on said nozzle forming a valve seat, and a valve member supported by said block and extending in cooperative relation with said valve seat, said valve member being effective to seat against said valve seat upon movement of said nozzle to said extended position and being effective to unseat from said seat upon movement of said nozzle to said contracted position.

3. Plastic injection molding apparatus according to claim 2 wherein the cross-sectional area of the orifice in said nozzle and the cross-sectional area of each of said passages are each relatively smaller than the cross-sectional area of said cylinder.

4. Plastic injection molding apparatus according to claim 2 wherein said valve seat is annular and said valve member is spherical, said valve seat and said valve member extending coaxially of said cylinder and said orifice.

5. Plastic injection molding apparatus according to claim 4 comprising an elongate member supported by said block and extending through said valve seat for supporting said valve member.

\* \* \* \* \*